Figure 1:
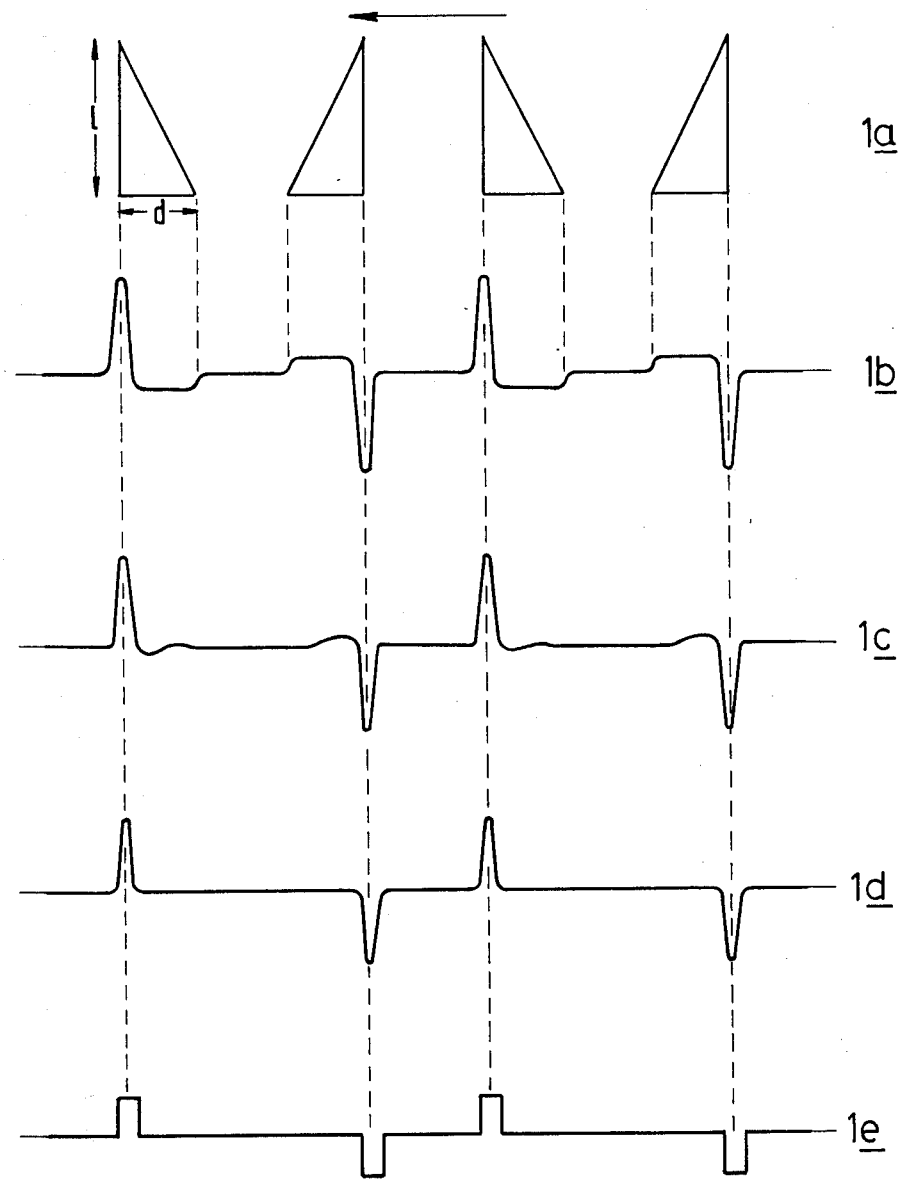

United States Patent [19]
Eastell et al.

[11] 4,035,623
[45] July 12, 1977

[54] SECURITY CARDS

[75] Inventors: Robert W. Eastell, Bristol; John Harrison; Allan Sharples, both of Basingstoke, all of England

[73] Assignee: McCorquodale & Company Limited, Basingstoke, England

[22] Filed: Mar. 2, 1976

[21] Appl. No.: 663,065

[30] Foreign Application Priority Data

Mar. 6, 1975 United Kingdom ............... 9327/75
Dec. 3, 1975 United Kingdom ............ 49574/75

[52] U.S. Cl. ................. 235/61.11 D; 235/61.12 M
[51] Int. Cl.² ................... G06K 7/14; G06K 19/06; G01N 21/30
[58] Field of Search ............. 235/61.11 D, 61.11 E, 235/61.12 M, 61.12 N

[56] References Cited

UNITED STATES PATENTS

| | | | |
|---|---|---|---|
| 3,037,695 | 6/1962 | Dickinson | 235/61.11 E |
| 3,654,435 | 4/1972 | Vaccaro | 235/61.11 E |
| 3,701,886 | 10/1972 | Jones | 235/61.11 E |
| 3,723,710 | 3/1973 | Crouse | 235/61.11 E |
| 3,749,889 | 7/1973 | Vaskunes et al. | 235/61.12 M |
| 3,753,255 | 8/1973 | Di Vero | 235/61.12 M |
| 3,812,328 | 5/1974 | Tramposch | 235/61.12 M |
| 3,818,446 | 6/1974 | Benson | 235/61.12 M |
| 3,891,831 | 6/1975 | Coles, Jr. | 235/61.11 E |
| Re. 28,198 | 10/1974 | Dobras | 235/61.11 E |

*Primary Examiner*—Vincent P. Canney
*Attorney, Agent, or Firm*—Kane, Dalsimer, Kane, Sullivan and Kurucz

[57] ABSTRACT

A method of recording machine-readable security data on a record medium, such as a cash dispenser card, is described in which the security data is deposited on the record medium as a sequence of magnetic characters. The characters may include a first magnetic character which when scanned in a given direction by a magnetic pick-up head having a sensing gap generates a characteristic signal exceeding a first threshold level in a positive direction but not exceeding a second lower threshold level in a negative direction, a second magnetic character which when scanned in the said given direction by a magnetic pick-up head having a sensing gap generates a characteristic signal exceeding the second lower threshold level in a negative direction but not exceeding the said first threshold level in a positive direction, and/or a third magnetic character which when scanned in the said given direction generates a characteristic signal exceeding both the first threshold level in a positive direction and the second threshold level in a negative direction. The first and second characters may comprise left-handed and right-handed right-angled triangles respectively and the third character may comprise a rectangle. The invention permits the recording off of any desired binary sequence by arranging that the first character represents a binary "1" and the second character represents a binary "0".

21 Claims, 3 Drawing Figures

SECURITY CARDS

This invention relates to the recording of machine-readable security data on a record midium such as a cash dispenser card.

To prevent fraudulent use of credit, cash dispenser, or other machine-readable cards which can be used to obtain access to particular services or goods, it is well known to include on each card a security number which may or may not be known by the authorised card-holder. The number is of course represented on the card in such a form that it cannot be recognised merely by inspecting the card. On the other hand, the number must be machine-readable so that when the card-holder presents the card at a transaction terminal, the number read from the card can be processed to verify the validity of the card and/or the identity of the card-holder. For example, the number read from the card can be compared with a number keyed in by the card-holder. Access is then permitted provided the two numbers agree with one another.

Various techniques have already been developed for recording a security number on a card. One common method is to incorporate a magnetic stripe in the card. Before issuing the card to the card-holder, the magnetic material is selectively magnetised by a signal representing the security number. A disadvantage of this method is that the number recorded on the magnetic stripe can be inadvertently erased. Moreover, it is relatively easy to reproduce a card with a magnetic stripe. An unauthorised card-holder may therefore derive the security number by "playing-back" the magnetic stripe and then subsequently reproduce fraudulent copies of the card.

It is also well known to record numbers, such as account numbers, on documents by printing the numbers in magnetic ink. The formation of each number or character then produces a characteristic output signal which can be recognised by suitable electronic circuits. Any required number can be deposited in this manner and the number cannot be erased. On the other hand, these numbers are readily identified merely by inspecting the card. Moreover, the shape of each character produces a relatively complex output signal and the recognition circuits are correspondingly complex. At present, therefore, an error rate of around 1% may result from the magnetic ink character recognition system known as E13B.

Another possibility is to deposit a sequence of rectangular bars of magnetic ink, the security number being represented as a characteristic of the spacing between the bars. Such a system is described, for example, in British Pat. No. 1,392,038. The disadvantage of this system is that, in order to provide security, the spacing between the bars is not measured until after the bars have been deposited. Thus it is virtually impossible to reproduce a card having exactly the same security number. Although this has the advantage of preventing fraudulent duplication of cards, it does mean that the numbers recorded on the card cannot be determined beforehand. It is therefore impossible to provide an authorised card-holder with a duplicate card having the same security number. In addition, it is frequently desirable to include on the card not only a security number but other numbers representing, for example, the card-holder's account number, the expiry date of the card, and a number identifying the particular type of card or the particular store which has issued the card.

In accordance with the present invention a method of recording security data on a record medium comprises forming a first magnetic character which when scanned in a given direction by a magnetic pick-up head having a sensing gap generates a characteristic signal exceeding a first threshold level in a positive direction but not exceeding a second, lower threshold level in a negative direction, forming a second magnetic character which when scanned in the said given direction by a magnetic pick-up head having a sensing gap generates a characteristic signal exceeding the said second, lower threshold level in a negative direction but not exceeding the first threshold level in a positive direction, and depositing a sequence of the magnetic characters along the record medium.

Preferably the first threshold level is a positive voltage and the second threshold level is a negative voltage. By feeding the record medium to a reader which includes a magnetic pick-up head and a discriminator responsive only to signals exceeding the respective threshold levels, and desired sequence of positive and negative signals ca be generated. This is easily converted to a representation of a security number by arranging that each positive signal represents a binary "1" and each negative signal represents a binary "0". It is therefore possible to record on the record medium any required sequence of binary digits merely by preselecting the appropriate sequence of the two magnetic characters.

The two characters may be combined with a third character which, when scanned in the same direction, generates a characteristic signal exceeding both the first threshold level in a positive direction and the second, lower threshold level in a negative direction. Each deposited sequence of characters will then include at least two of the three characters.

In a preferred embodiment of the invention the distribution of magnetic material forming the first magnetic character is controlled such that, when the character is scanned by a magnetic pick-up head, the quantity of magnetic material crossing the sensing gap in the pick-up head increases gradually at a substantially uniform rate from a base value to a peak value and then drops steeply back to the base value. On the other hand, the distribution of magnetic material forming the second magnetic character is controlled such that the quantity of magnetic material crossing the sensing gap increases steeply from the base value to the peak value and subsequently decreases at a more gradual, substantially uniform rate back to the base value. Preferably, the characters are discrete characters spaced apart from one another, in which case the base value for each character is zero, but the characters could also be contiguous with one another and/or with a continuous band or strip of magnetic material. The desired distribution of magnetic material is preferably obtained by appropriately shaping the characters. In the latter case, the edges of each shaped character are not necessarily continuous. For example, each character may be subdivided into a mass of descrete, identically shaped areas, such as squares or dots.

In one partiuclar example of the invention, the first and second characters each consist of triangles having a first edge inclined at 90°± 15° (preferably 90°± 5°) to a second edge. The corresponding first and second edges in the sequence of triangles are then arranged parallel or in line with one another. The third edge of each first character is then oppositely inclined to the third edge of each second character relative to the direction of reading. Preferably the triangles are left-handed and right-handed right-angled triangles respectively. The sensing gap in the magnetic pick-up head is then oriented so that it lies perpendicular to the bases of the triangles. In addition, for compactness, adjacent left and right triangles may be compounded into a rectangular bar to from the third magnetic character.

By arranging that the width of the sensing gap in the pick-up head is less than the base length of each triangle, each leading perpendicular edge (relative to the direction in which the characters are read) produces a distinct, positive pulse as the triangles cross the sensing gap while each trailing perpendicular edge produces a distinct, negative pulse. The sloping edges, however, produce only negligible pulses since, although the amount of magnetic material crossing the sensing gap at any instant is changing, the rate of change is small and remains substantially constant. If the sequence consisted solely of rectangular bars, each distinct positive pulse would be followed by a distinct negative pulse. By selectively introducing the sloping edges and arranging that the cardreader detects only the distinct positive and negative pulses, each positive pulse can be followed by either a positive or negative pulse (and vice-versa) so that it becomes possible to record and reproduce any desired combination of positive and negative pulses. Thus by arranging that a positive pulse represents a 1 and a negative pulse represents a 0, the deposited sequence of triangles with or without rectangular bars may represent any desired binary sequence.

The sloping edges of the triangles may be stepped, or saw-tooth, in order to provide modulation of the output signals. Any such modulation would normally have to be detected by frequency selective circuits in the card reader, and this would lead to additional security.

Figure 2:
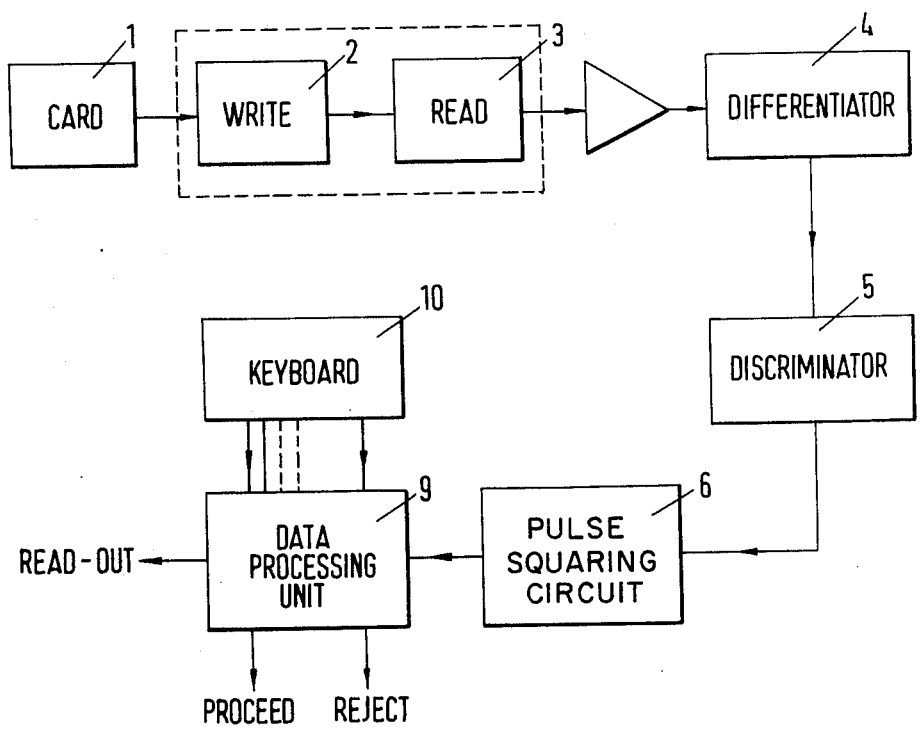
Figure 3:
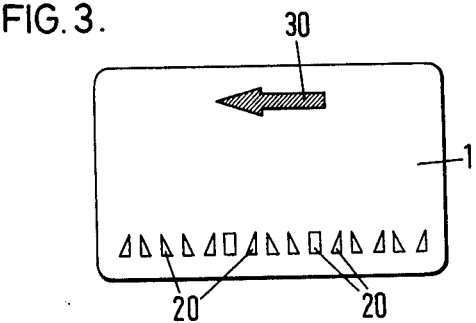

In order that the invention may be more clearly understood, one example will now be described with reference to the accompanying drawings in which:

FIG. 1 consisting of 1a through 1e, is a waveform diagram illustrating the waveforms derived when the illustrated sequence of magnetic characters is read by a magnetic pick-up head;

FIG. 2 is a block circuit diagram of a card reader for use with the record card of FIG. 3; and FIG. 3 is a record card carrying a sequence of magnetic characters representing a security number.

Referring first to FIG. 3, a plastics record card 1, such as a cash dispenser or credit card, has imprinted thereon a sequence of magnetic characters 20 in the form of left-handed and right-handed right-angled triangles together with rectangular bars. The illustrated sequence, when fed to a card reader in the direction indicated by the arrow 30 will generate a signal representing the binary sequence 01110100111001010. This is because each of the left-handed triangles generates a 0, each of the right-handed triangles generates a 1 and each rectangular bar generates a 1 followed by a 0. The binary sequence may include, for example, a secret or "pin" number known only to the authorised card-holder, an expiry date for the card, the account number of the card-holder, and a number representing the type of card (for example, Access or Barclay).

The final four characters of the sequence illustrated in FIG. 3 are shown, on a magnified scale, in FIG. 1a. Each character consists of a discrete area of magnetic material and the sequence is deposited on the record card by means of a silk screen printing process using a stencil. By interchanging the positions of the triangles any desired combination of 1's or 0's can be obtained. In order to conserve space on the card, two triangles may be merged into a single rectangular bar whenever the required binary sequence includes a 1 followed by a 0.

In use, when the record card 1 is fed into the card reader of FIG. 2, it passes firstly under a write head 2 and then under a magnetic pick-up or read head 3. The pick-up head includes a sensing gap having a width which is less than the base length of each triangle, relative to the direction in which the characters are read. Typically, the base of each triangle has a length '$d$' of about 1 mm. while the width of a typical sensing gap is 0.075 mm. In addition, the perpendicular height '$l$' of each triangle is about 2mm. while the parallel edges of the sensing gap are typically 6 mm. in lenght. The card reader is therefore insensitive to any wandering of the code line triangles in a direction perpendicular to the direction of reading. By arranging that the base of each triangle is approximately half the length of the perpendicular, a compromise is reached between a shorter base with a steeper sloping edge (for compactness) and a longer base with a more gradual sloping edge (for minimising the amplitude of the pulse produced by the sloping edge). A base of 1 mm. allows a code line consisting of approximately 52 bits on a 3 inch card.

The write head magnetises the complete area of each triangle and, assuming that the triangles approach the sensing gap in the direction indicated by the arrow at the top of the figure and the sensing gap is oriented so that it lies perpendicular to the bases of the triangles, the output from the pick-up head will have the form shown in FIG. 1b. This output signal is amplified and fed to a differentiator 4 to produce the output signal shown in FIG. 1c.

A discriminator 5 is set to provide a positive output pulse whenever its input exceeds a predetermined positive threshold level and a negative output pulse whenever the input exceeds a predetermined negative threshold level. The output from the discriminator thus has the form shown in FIG. 1d. These positive and negative pulses (representing the bits 1 and 0 respectively) are fed to a pulse squaring circuit 6 and the resulting digital pulses (FIG. 1e) are then processed in a data processing unit 9. In this unit the derived binary number is read-out and it may also be compared with a store of numbers. If there is agreement between the derived number and a selected store number, a "proceed" signal is fed out from the processing unit. The absence of agreement produces a "reject" signal.

One of the numbers stored in the processing unit 9 may be keyed-in by the card-holder via a keyboard 10. In general, however, the number keyed-in will not be the same as the number on the card because one of the numbers will be in a scrambled form. The processing unit then unscrambles the scrambled number before making the comparison.

If the binary sequence on the card includes an account number, the processing unit may include a "hot" store which is filled with the account numbers of card-holders who may be in debt. If the account number read from the card corresponds to one of these "hot" numbers, the "reject" signal is generated.

We claim:

1. A method of recording security data on a record medium comprising forming a first magnetic character which when scanned in a given direction by a magnetic pick-up head having a sensing gap of preselected dimensions generates a characteristic signal exceeding a first threshold level in a positive direction but not exceeding a second, lower threshold level in a negative direction, forming a second magnetic character which when scanned in the said given direction by a magnetic pick-up head having a sensing gap of preselected dimensions generates a characteristic signal exceeding the said second, lower threshold level in a negative direction but not exceeding the said first threshold level in a positive direction, and depositing a sequence of the magnetic characters on the record medium, the characters having a configuration and density distribution so that each character has a sharp magnetic flux increase at one point in the scanning direction to produce a characteristic signal of predetermined polarity when scanned by said pick-up head and gradual flux change for the remainder thereof to avoid a corresponding signal of opposing polarity when scanned by said pick-up head.

2. A method according to claim 1, further comprising forming and depositing in the said sequence a third magnetic character which when scanned in the said given direction by said magnetic pick-up head generates a characteristic signal exceeding both the first threshold level in a positive direction and the said second threshold level in a negative direction.

3. A method according to claim 1, in which the characters are deposited as discrete characters.

4. A card reader for reading a record card having security data recorded thereon by a method according to claim 1, the reader comprising a magnetising head for magnetising the sequence of characters, a magnetic pick-up head having a sensing gap arranged transverse to the direction in which the characters are to be read, the width of the sensing gap being less than the width of each character, means for advancing the card past the magnetising head and the pick-up head, a discriminator responsive to the output from the pick-up head for detecting signals exceeding the said first threshold level in a positive direction and signals exceeding the said second, lower threshold level in a negative direction, and means responsive to the output from the discriminator for obtaining a read-out of the security data.

5. A card reader according to claim 4, in which the security data is read out as a sequence of binary digits, a signal exceeding the first threshold level representing a binary 1 and a signal exceeding the second threshold level representing a binary 0.

6. A card reader according to claim 5, further comprisng a store for storing predetermined sequences of binary digits, and means for comparing the contents of the store with the binary readout from the discriminator.

7. A card reader according to claim 6, further comprisng a keyboard for manually entering data into the store, such that a number entered by the card-holder can be compared with a security number read from the card.

8. A record medium having a sequence of magnetic characters deposited thereon, the sequence representing security data and including a first character in the form of a magnetisable area which when scanned in a given direction by a magnetic read-head having a sensing gap of preselected dimensions generates a characteristic signal exceeding a first threshold level in a positive direction but not exceeding a second lower threshold level in a negative direction, and a second character in the form of a magnetisable area which when scanned in the said given direction by a magnetic read-head having a sensing gap of preselected dimensions generates a characteristic signal exceeding the said second lower threshold level in a negative direction but not exceeding the said first threshold level in a positive direction, the characters having a configuration and density distribution so that each character has a sharp magnetic flux increase at one point in the scanning direction to produce a characteristic signal of predetermined polarity when scanned by said pick-up head and gradual flux change for the remainder thereof to avoid a correspondng signal of opposing polarity when scanned by said pick-up head.

9. A record medium according to claim 8, in which the distribution of magnetic material within the respective areas forming each first magnetic character is controlled such that, when the character is scanned in the said given direction, the quantity of magnetic material increases gradually at a substantially uniform rate from a base value to a peak value and then drops steeply back to the base value, and the distribution of magnetic material within the respective areas forming each of the second magnetic characters is controlled such that, when the character is scanned in the said given direction, the quantity of magnetic material increases steeply from the base value to the peak value and subsequently decreases at a more gradual, substantially uniform rate back to the base value.

10. A record medium according to claim 9, in which the characters are discrete characters, the base value for each character being zero.

11. A record medium according to claim 10, in which the required distribution of magnetic material within the magnetisable area is controlled by shaping the outline of the characters.

12. A record medium according to claim 11, in which each of the characters is shaped as a triangle having a first edge inclined at $90°\pm 15°$ to a second edge, the sequence of triangles having their correspondng first and second edges either parallel or substantially in line with one another, and the third edge of each first character being oppositely inclined to the third edge of each second character relative to the direction of reading.

13. A record medium according to claim 12, in which the first and second edges are inclined at $90°\pm 5°$.

14. A record medium according to claim 13, in which the characters comprise left and right-handed right-angled triangles.

15. A record medium according to claim 12, in which the first and second characters comprise left and right-handed right-angled triangles respectively, and the length of the first edge is approximately half the length of the second edge in each triangle.

16. A record medium according to claim 8, in which said sequence further includes a third magnetic character comprising a magnetisable area which when scanned in the said given direction generates a characteristic signal exceeding both the first threshold level in a positive direction and the second threshold level in a nagative direction.

17. A record medium according to claim 16, in which the first and second characters are shaped as substantially right-angled tirangles and the third character is shaped as a rectangle.

18. A machine-readable magnetic code system comprising a sequence of magnetic characters adapted to be read by a magnetic reading head in a given direction, the head having a sensing gap of preselected dimensions, each character having leading and trailing edges which, when scanned by said head, generate positive and negative-going voltage peaks respectively, the system being characterized in that the code is read by detecting only positive-going voltage peaks extending above a predetermined upper threshold level and negative-going voltage peaks extending below a predetermined lower threshold level, the characters having a configuration and density distribution so that each character has a sharp magnetic flux increase at one point in the reading direction to produce a characteristic signal of predetermined polarity when scanned by said pick-up head and gradual flux change for the remainder thereof the avoid a corresponding signal of opposing polarity when scanned by said pick-up head.

19. A code system according to claim 18, in which said sequence of characters includes at least one first character having a distribution of magnetic material that provides an abrupt increase in the quantity of magnetic material passing the read head at the leading edge of the character but a more gradual decrease in the quantity of magnetic material passing the read head toward its trailing edge whereby the positive-going voltage peak associated with said leading edge exceeds said upper threshold level but the negative-going voltage peak associated with said trailing edge does not exceed said lower threshold level, and at least one second character having a distribution of magnetic material that provides an abrupt increase in the quantity of magnetic material passing the read head at the trailing edge of the character but a more gradual increase in the quantity of magnetic material following its leading edge whereby the negative-going voltage peak associated with said trailing edge exceeds said lower threshold level but the positive-going voltage peak associated with said leading edge does not exceed said upper threshold level.

20. A code system according to claim 19, in which said distribution of magnetic material within said first and second characters is obtained by shaping the outline of said characters in the form of substantially right-angled triangles, said first character being oriented to provide a substantially perpendicular leading edge and a sloping trailing edge relative to said direction of reading, and said second character being oriented to provide a sloping leading edge and a substantially perpendicular trailing edge.

21. A code system according to claim 20, in which the sequence of characters further includes at least one third character shaped in the form of a rectangle having leading and trailing edges substantially perpendicular to said direction of reading, said rectangular character generating a positive-going voltage peak exceeding the upper threshold level followed by a negative-going voltage peak extending below the lower threshold level.

* * * * *

UNITED STATES PATENT OFFICE
CERTIFICATE OF CORRECTION

PATENT NO. : 4,035,623
DATED : July 12, 1977
INVENTOR(S) : Robert W. Eastell Et Al It is certified that error appears in the above-identified patent and that said Letters Patent are hereby corrected as shown below:

In the ABSTRACT, line 24 the word "off" should read --of--.

Col. 1, line 5, the word "midium" should read --medium--.

Col. 2, line 15, before the word "first" the word --said-- should be inserted.

Col. 2, line 23, the word "and" should read --any--.

Col. 2, line 24, after "signals" the letters "ca" should read --can--.

Col. 3, line 10, the word "from" should read --form--.

Col. 4, line 19, the word "lenght" should read --length--.

Col. 6, line 64, the word "nagative" should read --negative--.

Col. 7, line 18, the word "the" should read --to--.

Signed and Sealed this

Seventh Day of February 1978

[SEAL]

Attest:

RUTH C. MASON
*Attesting Officer*

LUTRELLE F. PARKER
*Acting Commissioner of Patents and Trademarks*